Figure 1:
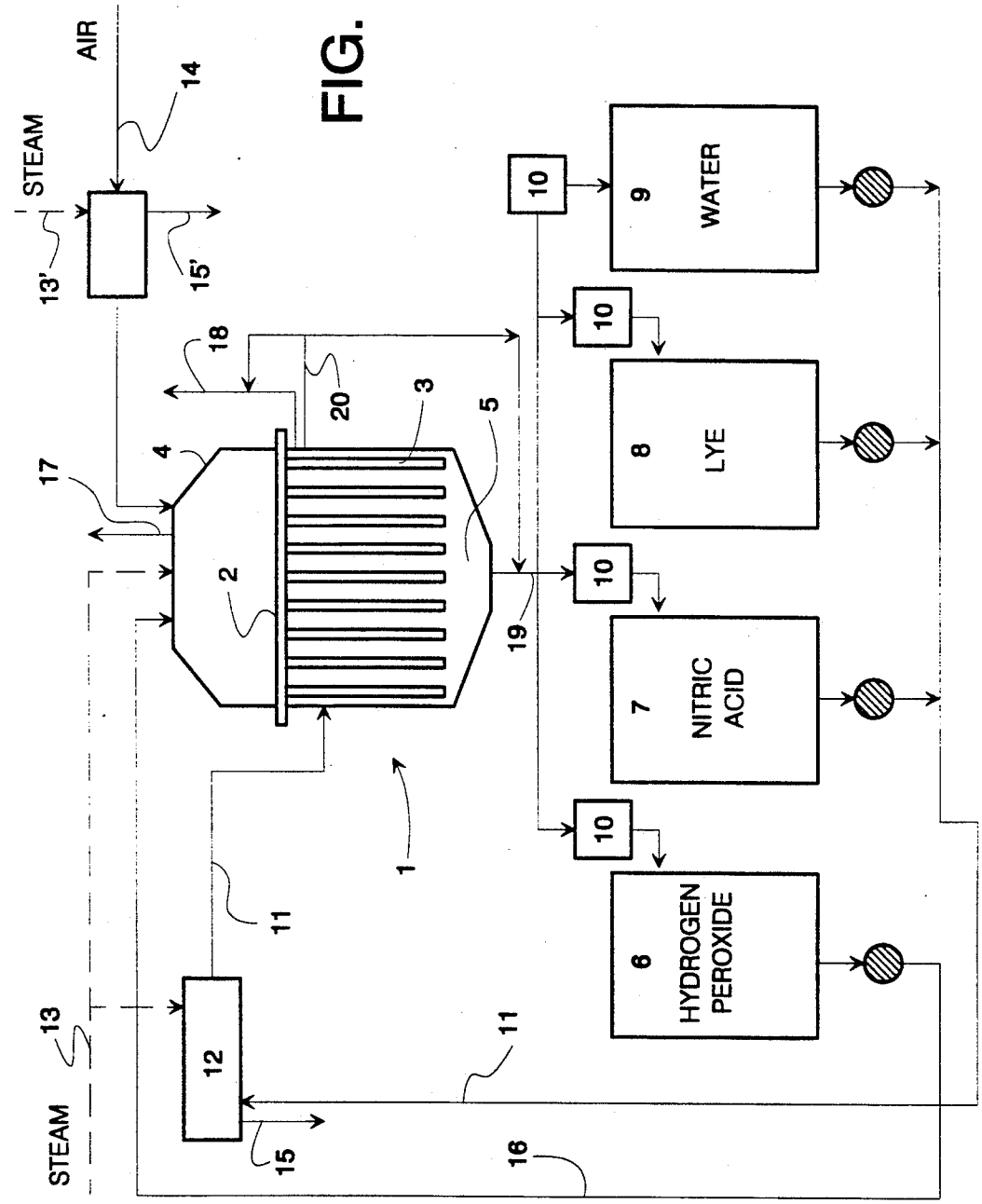

United States Patent [19]

Mäkiniemi et al.

[11] Patent Number: 5,217,629
[45] Date of Patent: Jun. 8, 1993

[54] PROCEDURE FOR CLEANING FILTER USED IN PRODUCTION OF HYDROGEN PEROXIDE FROM ANTHRAQUINONE

[75] Inventors: Esko Mäkiniemi, Jääli; Eeva-Liisa Mustonen, Oulu, both of Finland; Arto Sikander, Yamaguchi, Japan

[73] Assignee: Kemira OY, Helsinki, Finland

[21] Appl. No.: 756,844

[22] Filed: Sep. 10, 1991

[30] Foreign Application Priority Data

Sep. 10, 1990 [FI]  Finland ............................ 904405

[51] Int. Cl.$^5$ .................. B01D 29/62; C01B 15/023
[52] U.S. Cl. ....................................... 210/797; 134/2; 134/28; 134/29; 134/30; 210/757; 423/588; 585/252
[58] Field of Search .............. 210/409, 510.1, 500.25, 210/739, 759, 791, 797, 798, 670, 673, 694, 757, 758; 423/584, 588, 589, 590, DIG. 5, DIG. 13; 134/2, 3, 18, 26, 28, 29, 30; 585/251, 252

[56] References Cited

U.S. PATENT DOCUMENTS

| | | | |
|---|---|---|---|
| 2,105,835 | 1/1938 | Krause | 210/759 |
| 3,307,909 | 3/1967 | Reilly | 423/588 |
| 3,694,376 | 9/1972 | Kabish et al. | 423/588 |
| 3,998,937 | 12/1976 | Vaughan | 423/588 |
| 4,113,613 | 9/1978 | Sekoulov et al. | 210/794 |
| 4,552,748 | 11/1985 | Berglin et al. | 423/588 |
| 5,071,634 | 12/1991 | Maunula et al. | 423/588 |

FOREIGN PATENT DOCUMENTS

| | | | |
|---|---|---|---|
| 1272292 | 7/1968 | Fed. Rep. of Germany | 423/588 |
| 82669 | 12/1990 | Finland | 210/794 |
| 50-11986 | 2/1975 | Japan | 210/500.25 |
| 361414 | 11/1973 | Sweden | 210/794 |
| 1573967 | 3/1977 | United Kingdom | 210/794 |
| 1573968 | 3/1977 | United Kingdom | 210/794 |

*Primary Examiner*—Joseph W. Drodge
*Attorney, Agent, or Firm*—Seed & Berry

[57] ABSTRACT

The present invention relates to a procedure for cleaning a sinter used for filtering a metal catalyst suspension. As taught by the invention, the sinter is treated with an aqueous solution of hydrogen peroxide for displacing the metal catalyst left in the pores of the sinter with the aid of the gas produced by the decomposition of the hydrogen peroxide, caused by the metal catalyst, until gas formation ceases, indicating that no significant quantities of metal catalysts are left in the sinter. Such hydrogen peroxide decomposition is produced by the so-called anthraquinone process, in which an anthraquinone derivative is dissolved in an organic solvent then reduced with the aid of hydrogen gas in the presence of a catalyst to the corresponding anthraquinone derivative; the catalyst is then separated from such solution by filtering. Then, such corresponding anthraquinone derivative is oxidized with air or oxygen, whereby it reverses to the state preceding hydrogenation, i.e., to the original anthrquinone derivative, while at the same time producing hydrogen peroxide.

19 Claims, 1 Drawing Sheet

PROCEDURE FOR CLEANING FILTER USED IN PRODUCTION OF HYDROGEN PEROXIDE FROM ANTHRAQUINONE

The present invention relates to a procedure for cleaning a filter, and particularly for a sinter used in filtering metal catalyst suspension. The present invention is particularly well suited for cleaning a filter unit consisting of a plurality of sinters and contaminated by matter, from catalytic hydrogenation of anthraquinone or a derivative thereof, i.e. for the purification treatment of the primary filter unit of a hydrogen peroxide plant.

Hydrogen peroxide can, as is known in the art, be produced by the so-called anthraquinone process. In said procedure, an anthraquinone derivative is dissolved in an organic solvent consisting of one or more components. A solution thus produced, called generally a working solution, is first conducted into a hydrogenation step. At the hydrogenation step part of the anthraquinone derivative is with the aid of hydrogen gas reduced in the presence of a catalyst to the corresponding anthraquinone derivative. Prior to the next step, i.e. oxidation, the catalyst is separated from the working solution. The separation of the catalyst is most often carried out by filtering. At the oxidation step the anthraquinone derivative is oxidized with air or oxygen, whereby it reverses to the state preceding hydrogenation, i.e., to the anthraquinone derivative. At the same time, hydrogen peroxide is produced. The hydrogen peroxide thus produced is removed from the working solution by extracting it with water. After the extraction the working solution is dried and conducted back to the hydrogenation. The aqueous solution of the hydrogen peroxide obtained at the extraction step is purified and concentrated (Kirk-Othmer, Encyclopedia of Chemical Technology, 3. painos, Vol. 13, pages 16-21).

For separating a suspension catalyst taking place by filtering, for instance ceramic or metal sinter filters (Chemical Processing, January 1982, page 24), as well as carbon filters (DE-PS-1 272 292) can be used. In continuous action filtering, the filters become gradually blocked in spite of the backflushing systems used.

Thus, the object of the present invention is to provide a procedure for cleaning a metallic or ceramic sinter used for filtering a metal catalyst suspension of a finely powdered metal catalyst entered into its pores more efficiently than before.

Cleaning metal sinter filters takes in general place so that they are removed from the cover plates of a primary filter unit and taken into wash basins in which they are submerged separately into washing solutions. The washing process comprises several manual steps and is therefore both cumbersome and time consuming.

Another purpose of the present invention is therefore to provide a procedure for cleaning a filter unit consisting of a plurality of sinters and contaminated by matter, from catalytic hydrogenation of anthraquinone or a derivative thereof, without detaching individual sinters from the cover plate of the filter unit. Therefore, the invention is well appropriate for cleaning filters used for separating noble metal catalysts, and in the production process of hydrogen peroxide especially appropriate for cleaning filters used for filtering noble metal catalysts.

The main characteristic features become obvious in the accompanying claims.

In the procedure of the invention a metallic or ceramic porous sinter is treated with an aqueous solution of hydrogen peroxide for displacing the metal catalyst present in the pores of the sinter with the aid of a gas generated by the decomposition of the hydrogen peroxide caused by the metal catalyst until the formation of gas ceases indicating that no substantial quantities of the metal catalyst are left in the sinter.

The procedure of the present invention is therefore highly selective because the gas generation caused by the decomposition of the hydrogen peroxide is concentrated particularly into those pores in the filter which contain said metal catalyst. The forming gas "blows" efficiently the finely powdered metal catalyst out from the pores of the sinter. An advantage of the procedure is that the formation of gas ceases when no significant quantities of the metal catalyst are left in the pores of the sinter, which easily leads to the conclusion that the sinter is clean enough.

The procedure of the invention is especially appropriate for cleaning a filter unit consisting of a plurality of sinters, and contaminated by matter, from catalytic hydrogenation of anthraquinone or a derivative thereof, whereby the individual sinters need no longer be detached from the cover plate of the primary filter unit. Herewith, the treatment of separate sinters is avoided and at the same time, the risk is minimized that individual sinters are damaged. With the present design, also the need to seal filters diminishes substantially. By the aid of the invention, also such advantageous design, from the point of view of work hygiene, is obtained when the individual sinters need no longer be detached from the filter unit.

According to the invention, the filter unit flushed with a solvent used for dissolving anthraquinone or a derivative thereof and released thereafter from the solvent by steaming is treated with 5 to 50 percent aqueous solution of hydrogen peroxide so long and so many times that substantially no more gas generates, whereafter the filter unit is washed with water and dried at the end.

A particularly preferable measure is to treat the filter unit with diluted, 5 to 15 percent, for instance 10 per cent, aqueous solution of hydrogen peroxide.

The filter unit washed with water may once more be washed with a warm aqueous solution of an acid dissolving the metal catalyst, prior to renewed hydrogen peroxide treatment, water washing and final drying for a more thorough removal of the metal catalyst from the sinters of the filter unit. The purification efficiency may further be intensified by washing the filter unit after the solvent flushing and steaming with a warm alkaline aqueous solution prior to the actual hydrogen peroxide treatment. The cleaning treatment may further be intensified by treating the filter unit prior to the washing with the warm alkaline aqueous solution with an aqueous solution of hydrogen peroxide and by washing with water thereafter.

For the aqueous solution of an acid, a 10 to 50 percent aqueous solution of nitric acid at 20° to 80° C. temperature can be used. Particularly advantageously a 25 to 35 per cent, e.g. 30% aqueous solution of nitric acid is used, this being at 60° to 70° C. temperature, e.g. about 65° C.

For the aqueous solution of an alkaline, a 1 to 20 per cent, preferably about 5%, aqueous solution of sodium hydroxide at a temperature of over 20° C., preferably 70 to 90° C., for instance about 80° C., can be used.

In the present context all percentages are indicated as volumetric percentages, unless otherwise noted.

The procedure of the invention is especially appropriate for cleaning ceramic or metallic porous sinters, said sinters being used for filtering noble metal catalysts, particularly Pd black.

The U.S. Pat. No 4,113,613 discloses that it is known in the art to condition fixed-bed filters made from granular substance, such as sand filters, by generating gas bubbles catalytically in the bed. The gas bubbles catch the granular filter material, whereby the filter becomes more permeable in the manner of a dry filter. Said reference has no mention concerning cleaning of sinters, instead, it does give a mention of improving the filter characteristics of a bed consisting of granular matter.

The invention is described below in detail, reference being made to the accompanying drawing presenting a schematical, cross-sectional vertical image of a washing equipment appropriate for implementing the procedure of the invention.

In the accompanying figure is shown a washing unit for cleaning metallic primary filters of a hydrogen peroxide plant. The actual washing tank is generally indicated by reference numeral 1, and it consists of an upper part 4 and a lower part 5, wherebetween the cover 2 of the filter unit with sinters 3 is tightly disposable. The metal sinters 3 are elongated filter elements closed at the lower ends, their open upper end being tightly connected to an aperture in the cover 2 located at an equivalent point so that the streams between the upper and the lower side of the cover pass through said apertures and through the walls of the sinters 3 joined thereto.

To the upper part 4 of the tank 1 drying air is conducted in a tube 4, whereto a heat exchanger 12 has been attached for heating the drying air with the aid of steam 13', this being let out from the heat exchanger 12 as condensate 15'. To the upper part 4, steam can be also conducted directly from the pipeline 13. Reference numeral 17 refers to an outlet pipe connected to the upper part 4. In addition, an aqueous solution of hydrogen peroxide is conducted from the container 6 along the tube 16. Thus the aqueous solution of hydrogen peroxide flows from the upper part 4 into the sinters to their so-called clean side, and through the sinters into the lower part 5, that is, to the so-called dirty side of the sinters 3, in other words, to the opposite direction than the metallic catalyst suspension had flown during the filtering of the metal catalyst in the catalytic hydrogenation of anthraquinone or a derivative thereof. This assists in a particularly effective manner the release of the metal catalyst caught in the pores of the sinters 3 because it is easier to remove the metal catalyst in the direction from which it came. Viz., when hydrogen peroxide decomposes, water and oxygen gas are produced, increasing the pressure on the clean side of the sinters to the extent that differential pressure is formed between the clean side and the dirty side of the sinters 3, forcing the metal catalyst caught in the pores of the filter elements 3 out from the pores in the same direction as they had entered said pores.

The washing unit comprises further containers for aqueous solution of nitric acid 7, aqueous solution of lye alkaline 8 and water 9, these being alternately supplied along the tube 11 to the lower part 5 of the washing container 1, whereby also the pipeline 11 is provided with a heat exchanger 12 for heating said flows indirectly with the aid of steam 13.

In the upper part of the lower part 5 of the washing container 1 is also connected a discharge pipe 18 and a pipe 20 for letting out washing solutions from the lower part 5 as an overflow in order to return these into their respective containers 6,7,8 or 9 through a discharge pipe 19 connected to the bottom of the lower part 5 of the washing container 1 and the filter 10 joined to each container 6,7,8 and 9. The pore size of the filters 10 must be smaller than the pore size of the metal sinters 3 for preventing solid impurities from entering the containers 6,7,8 and 9. It goes without saying that said fresh solution is added into the containers 6,7,8,9 if needed.

The invention is described also below in detail with the aid of examples.

EXAMPLE 1

As shown in the figure, the so-called short washing programme was carried out in the washing unit of a hydrogen peroxide plant.

The cover 2 of one filter unit with the sinters 3 (Pall Filters PSS, Pall Corporation, Great Britain) was lifted into a washing tank 1 after the filter unit had been backflushed with a solvent component (aromatic hydrocarbon) of a working solution. In the upper part 4 of the washing tank 1, i.e. the so-called clean side, filtered steam 13 (aty 2 to 2.5 aty 135° to 140° C.) was conducted, the steam was allowed to exit through a breather tube 18 of the dirty side, while a small amount of condensate was left in the washing tank 1. After the steaming, preheated ion exchanged pure water 9 was pumped through a heat exchanger 12 (65° C.) and through a tube 11 to the dirty side of the filter element 3 for about 15 minutes. From the dirty side the water was conducted from the lower part 5 of the washing tank 1 as overflow 20 through the filter 10 back to the water tank 9. Next, for about 20 minutes diluted (10%) $H_2O_2$) aqueous solution of hydrogen peroxide at room temperature (20° C.) was pumped through the filter elements 3 from the clean side to the dirty side from the tank 6. The hydrogen peroxide treatment was followed by flushing with water (as before, 65° C., 15 mins). Prior to the final drying the sinters 3 were heated by conducting steam 13 on their clean side for about 5 mins, the uncondensed steam was conducted into the breather tube 18 and the condensate at the end of the steaming into the water tank 9. Finally, the drying of the sinters 3 was carried out by conducting filtered, hot (105° C.) pressurized air 14 on their clean side for about 20 mins, and the air was discharged through the breather tube 18 of the dirty side.

EXAMPLE 2

As shown in FIG. 1, the so-called medium length washing programme was carried out in the washing unit of a hydrogen peroxide plant.

The cover plate 2 of one filter unit with the sinters 3 (Pall Filter PSS) was lifted into the washing tank 1. Prior to the transfer, the sinters 3 had been flushed with an organic solvent. First, into the upper part 4 of the washing tank 1, to the so-called clean side, steam 13 (2 to 2.5 aty 135° to 140° C.) was conducted, the steam was allowed to exit through the breather tube 18 of the dirty side, and the little amount of the condensate thus generated was left in the washing tank 1. Subsequent to the steaming, pure, ion exchanged water 9 was pumped through a heat transfer means 12 (65° C.) on the dirty side of the sinters 3 for about 15 mins. From the dirty side of the washing tank 1 the water was conducted as overflow 20 through the filter 10 back into the water tank 9. Next, for about 20 minutes diluted (10%) aqueous solution of hydrogen peroxide 6 at room temperature (20° C.) was pumped through the sinters 3 from the clean side to the dirty side. The hydrogen peroxide treatment was followed by flushing with water (as before, 65° C., 15 mins). After flushing with water, preheated nitric acid solution 7 (30%) was pumped through the heat transfer means 12 into the washing tank 1 at about 65° C., again on the dirty side of the sinters 3. From the dirty side of the washing tank 1 the solution of nitric acid was conducted as overflow 20 through the filter 10 back into the nitric acid tank 7. After the acid treatment, flushing with water (65° C., 15 mins) was carried out. Prior to the final drying, the sinters 3 were heated by conducting steam 13 on their clean side for about 5 mins, the uncondensed steam being conducted into the breather tube 18, and the condensate at the end of the steaming step into the water tank 9. Finally, the drying of the sinters 2 was carried out by conducting filtered, hot (105° C.) pressurized air 14 on their clean side for about 20 mins, and the air exited through the breather tube 18 of the dirty side.

EXAMPLE 3

As shown in the figure, a so-called long washing programme was carried out in the washing unit of the hydrogen peroxide plant.

The cover plate 2 of one filter unit with the sinters 3 (Pall Filters PSS) was lifted into the washing tank 1. In the upper part 4 of the washing tank 1, on the so-called clean side, filtered steam 13 (2 to 2.5 aty, 135 to 140° C.) was conducted, the steam being allowed to exit through the breather tube 18 of the dirty side, and a small amount of the condensate thus produced was left in the washing tank 1. Preheated lye solution 8 (5% NaOH) was pumped through a heat transfer means 12 at about 80° C. along the tube 11 into the washing tank for about 30 minutes. From the washing tank 1 the lye exited as overflow 20 through the filter 10 back into the lye container 8. The catalyst released during the steaming and the lye wash was separated with the filter 10 of the lye cycle. After the lye wash, the solution was discharged from the washing tank through a tube 19. After the lye wash, pure, ion exchanged water 9 was pumped through the heat transfer unit 12 at about 65° C. to the dirty side of the sinters for about 15 mins. From the dirty side the water was conducted as overflow 20 through the filter 10 back into the water tank 9. Next, for about 20 minutes diluted (10%), aqueous hydrogen peroxide solution 6 at room temperature (20° C.) was pumped through the sinters 3 from the clean side to the dirty side. The hydrogen peroxide treatment was followed by flushing with water (as before, 65° C., 15 mins). Next, preheated nitric acid solution 7 (30%) was pumped through the heat transfer unit 22 and the tube 11 into the washing tank at about 65° C., again on the dirty side of the sinters 3. From the dirty side of the washing tank 1, the nitric acid solution was conducted as overflow 20 through the filter 10 back into the nitric acid container 7. After the acid treatment, flushing with water (65° C., 15 mins), hydrogen peroxide treatment (10% $H_2O_2$, 20° C., 20 mins) and flushing with water (65° C. 15 mins) carried out. Prior to the final drying, the sinters 3 were heated by conducting steam 13 on their clean sides for about 5 mins, the uncondensed steam being conducted into the breather tube 18, and the condensate after terminating the steaming into the water tank 9. Finally, the drying of the sinters 3 was carried out by conducting filtered, hot (105° C.) pressurized air on their clean side for about 20 minutes, and the air exited through the breather tube 18 of the dirty side.

Using the washing programmes of the present invention, a particularly successful end result is obtained compared with a treatment in which the filter unit is merely treated with the aqueous hydrogen peroxide solution.

We claim:

1. A procedure for cleaning a sinter having pores used for filtering out a metal catalyst suspension and contaminated by matter from a catalytic hydrogenation of anthraquinone or a derivative thereof, characterized in that the sinter is treated with an aqueous hydrogen peroxide solution for displacing a metal catalyst from said metal catalyst suspension present in the pores of the sinter with the aid of a gas generated by decomposition of the hydrogen peroxide caused by the metal catalyst.

2. A procedure according to claim 1 for cleaning a filter unit consisting of a plurality of said sinters comprising flushing the filter unit with a solvent used for dissolving the anthraquinone or its derivative and then by steaming the filter unit to remove the solvent therefrom, characterized in that the flushed and steamed filter unit is then treated with the aqueous hydrogen peroxide solution, whereafter the filter unit is washed with water and then dried.

3. A procedure according to claim 1 or 2, characterized in that the filter unit is treated with 5 to 15 percent aqueous hydrogen peroxide solution.

4. A procedure according to claim 3, characterized in that said sinter that is cleaned is a ceramic or metallic sinter which has been used for filtering said noble metal catalyst.

5. A procedure according to claim 4 wherein said noble metal catalyst is Pd black.

6. A procedure according to claim 2, characterized in that the water-washed filter unit is further washed with a warm aqueous solution of an acid dissolving the metal catalyst, prior to renewed treatment with the aqueous hydrogen peroxide solution, water washing and final drying.

7. A procedure according to claim 6, characterized in that after the solvent flushing and steaming the filter unit is washed with a warm alkaline aqueous solution and flushed with water prior to treatment with the aqueous hydrogen peroxide solution.

8. A procedure according to claim 7 characterized in that a 1 to 20 percent aqueous NaOH solution at a temperature above 20° C. is used as the warm alkaline aqueous solution.

9. A procedure according to claim 8 wherein said temperature is from 70° C. to 90° C.

10. A procedure according to claim 8 or 9 wherein said aqueous NaOH solution is about 5% NaOH.

11. A procedure according to claim 6, characterized in that prior to the washing with the warm alkaline aqueous solution, the filter unit is subjected to treatment with the aqueous hydrogen peroxide solution and washing with water.

12. A procedure according to claim 6, characterized in that a 10 to 50 percent aqueous solution of nitric acid at a temperature 20° C. to 80° C. is used in the acid washing step.

13. A procedure according to claim 12, characterized in that a 25 to 35 percent aqueous solution of nitric acid at a temperature from 60° C. to 70° C. is used in the acid washing step.

14. A procedure according to any one of claims 1, 2, 7, 11, 12, 13 or 8, characterized in that a ceramic or metallic sinter is washed which has been used for filtering a noble metal catalyst.

15. A procedure according to claim 14, characterized in that said ceramic or metallic sinter is washed which has been used for filtering said noble metal catalyst.

16. A procedure according to claim 15 wherein said noble metal catalyst is Pd black.

17. A procedure according to claim 6, characterized in that said sinter that is cleaned is a ceramic or metallic sinter which has been used for filtering said noble metal catalyst.

18. A procedure according to claim 17 wherein said noble metal catalyst is Pd black.

19. A procedure according to claim 2 wherein the aqueous hydrogen peroxide solution is 5% to 50% hydrogen peroxide.

* * * * *